(12) United States Patent
Kim et al.

(10) Patent No.: US 10,310,917 B2
(45) Date of Patent: Jun. 4, 2019

(54) APPARATUS AND METHOD FOR PROCESSING DATA

(71) Applicant: HANHWA TECHWIN CO., LTD., Changwon-si (KR)

(72) Inventors: Ji Min Kim, Changwon-si (KR); Min Suk Sung, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 101 days.

(21) Appl. No.: 15/016,514

(22) Filed: Feb. 5, 2016

(65) Prior Publication Data
US 2016/0366694 A1    Dec. 15, 2016

(30) Foreign Application Priority Data

Jun. 9, 2015   (KR) .......................... 10-2015-0081320

(51) Int. Cl.
| | |
|---|---|
| H04W 72/12 | (2009.01) |
| G06F 9/54 | (2006.01) |
| H04L 1/18 | (2006.01) |
| H04L 1/00 | (2006.01) |
| H04L 12/841 | (2013.01) |
| H04L 12/879 | (2013.01) |
| H04L 1/16 | (2006.01) |
| H04W 28/12 | (2009.01) |

(Continued)

(52) U.S. Cl.
CPC ............ *G06F 9/542* (2013.01); *H04L 1/0002* (2013.01); *H04L 1/188* (2013.01); *H04L 1/1832* (2013.01); *H04L 47/28* (2013.01); *H04L 49/901* (2013.01); *H04L 1/1685* (2013.01); *H04L 1/187* (2013.01); *H04L 1/1867* (2013.01); *H04L 47/34* (2013.01); *H04W 28/12* (2013.01); *H04W 28/18* (2013.01)

(58) Field of Classification Search
CPC ......... H04W 4/12; H04L 51/06; H04L 5/0053
USPC .................................................. 370/329–332
See application file for complete search history.

(56) References Cited

U.S. PATENT DOCUMENTS

2003/0086407 A1*  5/2003  Bhatt ..................... H04L 1/0002
                                                            370/345
2003/0133470 A1   7/2003  Tanaka
(Continued)

FOREIGN PATENT DOCUMENTS

| CN | 102594702 A | 7/2012 |
|---|---|---|
| CN | 103428040 A | 12/2013 |
| JP | 6-19823 A | 1/1994 |

(Continued)

OTHER PUBLICATIONS

Communication dated Sep. 30, 2018, issued by the Chinese Patent Office in counterpart Chinese Application No. 201610192146.X.

*Primary Examiner* — Faruk Hamza
*Assistant Examiner* — Jean F Voltaire
(74) *Attorney, Agent, or Firm* — Sughrue Mion, PLLC

(57) ABSTRACT

Provided are an apparatus and method for processing data by detecting an event on an interrupt or polling basis according to data transmitting or receiving periods. The apparatus includes a buffer configured to store one or more wireless packets, a period determination unit configured to determine a period of transmitting or receiving the wireless packets, and a data processor configured to process data included in the wireless packets by detecting an event in a polling mode or an interrupt mode according to the period.

20 Claims, 7 Drawing Sheets

(51) Int. Cl.
*H04W 28/18* (2009.01)
*H04L 12/801* (2013.01)

(56) References Cited

U.S. PATENT DOCUMENTS

2007/0147332 A1\*  6/2007  Lappetelainen ...... H04W 74/06
                                                  370/346
2008/0225824 A1\*  9/2008  Meylan ................. H04L 1/1685
                                                  370/346

FOREIGN PATENT DOCUMENTS

| | | |
|---|---|---|
| JP | 2003-309567 A | 10/2003 |
| KR | 10-1999-0038314 A | 6/1999 |
| KR | 10-2001-0007856 A | 2/2001 |
| KR | 10-2001-0060869 A | 7/2001 |
| KR | 10-0697988 B1 | 3/2007 |
| KR | 10-2014-0021433 A | 2/2014 |

\* cited by examiner

APPARATUS AND METHOD FOR PROCESSING DATA

CROSS-REFERENCE TO THE RELATED APPLICATION

This application claims priority from Korean Patent Application No. 10-2015-0081320 filed on Jun. 9, 2015 in the Korean Intellectual Property Office, the disclosure of which is incorporated herein in its entirely by reference.

BACKGROUND

1. Field

Apparatuses and methods consistent with exemplary embodiments related to data processing, and more particularly to data processing by detecting an event on an interrupt or polling basis according to data transmitting/receiving periods.

2. Description of the Related Art

Events generated in a system may be processed by a central processing unit (CPU) in a polling mode or an interrupt mode.

Events are periodically processed in the polling mode, while event detection is asynchronously performed and processed in the interrupt mode.

SUMMARY

The exemplary embodiments of the inventive concept provide an apparatus and method for processing data by detecting an event on an interrupt or polling basis according to a data transmitting/receiving period.

The above and other objects of the inventive concept will be described in or be apparent from the following description of the exemplary embodiments.

According to an aspect of an exemplary embodiment, there is provided an apparatus for processing data which may include: a buffer configured to store one or more wireless packets, a period determination unit configured to determine a period of transmitting or receiving the wireless packets, and a data processor configured to process data included in the wireless packets by detecting an event in a polling mode or an interrupt mode according to the period.

According to another aspect of an exemplary embodiment, there is provided a method for processing data which may include: storing one or more wireless packets in a buffer; determining a period of transmitting or receiving periods of the wireless packets; and processing data included in the wireless packets by detecting an event in a polling mode or an interrupt mode according to the period.

As described above, in the apparatus and method for processing data according to the exemplary embodiments, data is processed by detecting events on an interrupt or polling basis according to the data transmitting/receiving period, thereby preventing data from being damaged while preventing unnecessary power consumption.

BRIEF DESCRIPTION OF THE DRAWINGS

The above and other features and aspect of the inventive concept will become more apparent by describing in detail exemplary embodiments thereof with reference to the attached drawings, in which.

DETAILED DESCRIPTION OF THE EXEMPLARY EMBODIMENTS

Advantages and features of the inventive concept may be understood more readily by reference to the following detailed description of exemplary embodiments and the accompanying drawings. The inventive concept may, however, be embodied in many different forms and should not be construed as being limited to the embodiments set forth herein. Rather, these embodiments are provided so that this disclosure will be thorough and complete and will fully convey the inventive concept to those skilled in the art, and the inventive concept will only be defined by the appended claims.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
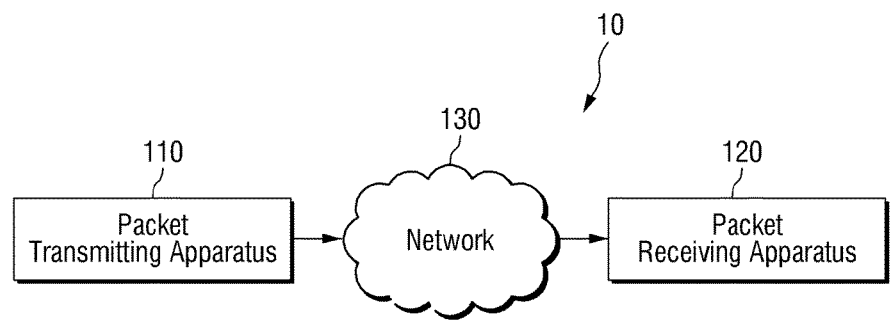
FIGS. 1 and 2 are diagrams illustrating a data processing system according to exemplary embodiments.
Figure 2:
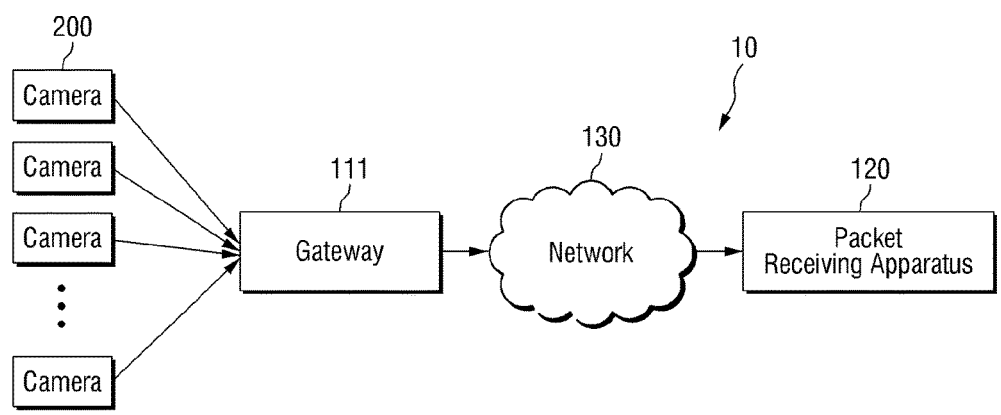

FIGS. 1 and 2 are diagrams illustrating a data processing system according to an exemplary embodiment.

Referring to FIGS. 1 and 2, the data processing system 10 includes a packet transmitting apparatus 110 and a packet receiving apparatus 120. The packet transmitting apparatus 110 may transmit packets and the packet receiving apparatus 120 may receive the packets transmitted from the packet transmitting apparatus 110.

At least one of the packet transmitting apparatus 110 and the packet receiving apparatus 120 according to the exemplary embodiment may transmit and receive a packet by a wireless communication method. For example, if the packet transmitting apparatus 110 transmits a packet in a wireless manner, the packet receiving apparatus 120 may receive the packet in a wireless or wired manner. If the packet transmitting apparatus 110 transmits a packet in a wireless or wired manner, the packet receiving apparatus 120 may receive the packet in a wireless manner. Hereinafter, the packet transmitted or received in a wireless manner will be referred to as a wireless packet.

As the packet transmitting apparatus 110 and the packet receiving apparatus 120 transmits and receives the wireless packet by a wireless communication method, a network 130 relaying communications between the packet transmitting apparatus 110 and the packet receiving apparatus 120 may support a wireless network. For example, the network 130 may support a proprietary radio frequency (RF), but the inventive concept is not limited thereto.

The following description will be made on an assumption that the packet transmitting apparatus 110 and the packet receiving apparatus 120 transmits and receives wireless packets by a wireless communication method, respectively, but the inventive concept is not limited thereto. For example, only one of the packet transmitting apparatus 110 and the packet receiving apparatus 120 transmits or receives wireless packets by the wireless communication method, and a data processing apparatus 600 to be described later (see FIG. 6) may be included in the packet transmitting apparatus 110 or the packet receiving apparatus 120 operating by the wireless communication method.

The packet transmitting apparatus 110 and the packet receiving apparatus 120 according to an exemplary embodiment may be a low power wireless communication apparatus. Since the packet transmitting apparatus 110 and the packet receiving apparatus 120 are low power wireless communication apparatuses, they may wirelessly transmits and receives packets, respectively, while being driven by battery power. In addition, the packet transmitting apparatus 110 or the packet receiving apparatus 120 may include a data processor for processing data included in the wireless packets, and the data processor may be driven with relatively low power in order to reduce power consumption.

For example, the packet transmitting apparatus 110 may be an apparatus incorporating a camera for transmitting an image photographed by the camera or an apparatus transmitting images transferred from one or more cameras.

FIG. 2 illustrates that a gateway 111 as the packet transmitting apparatus 110 receives images from a plurality of cameras 200 and transmits the received images to the packet receiving apparatus 120.

The gateway 111 may perform data processing on the images received from the plurality of cameras 200 and transmit the data-processed images to the packet receiving apparatus 120. For example, the gateway 111 may encode data of the received images and may constructs the encoded data as packets for transmission.

As described above, the gateway 111 may be a low power wireless communication apparatus, so that it may encode images and transmit the packets while consuming a small amount of power.

Likewise, the packet receiving apparatus 120 may also be a low power wireless communication apparatus. Accordingly, the packet receiving apparatus 120 may receive wireless packets and may decode the data included in the wireless packets while consuming a small amount of power.

Figure 3:
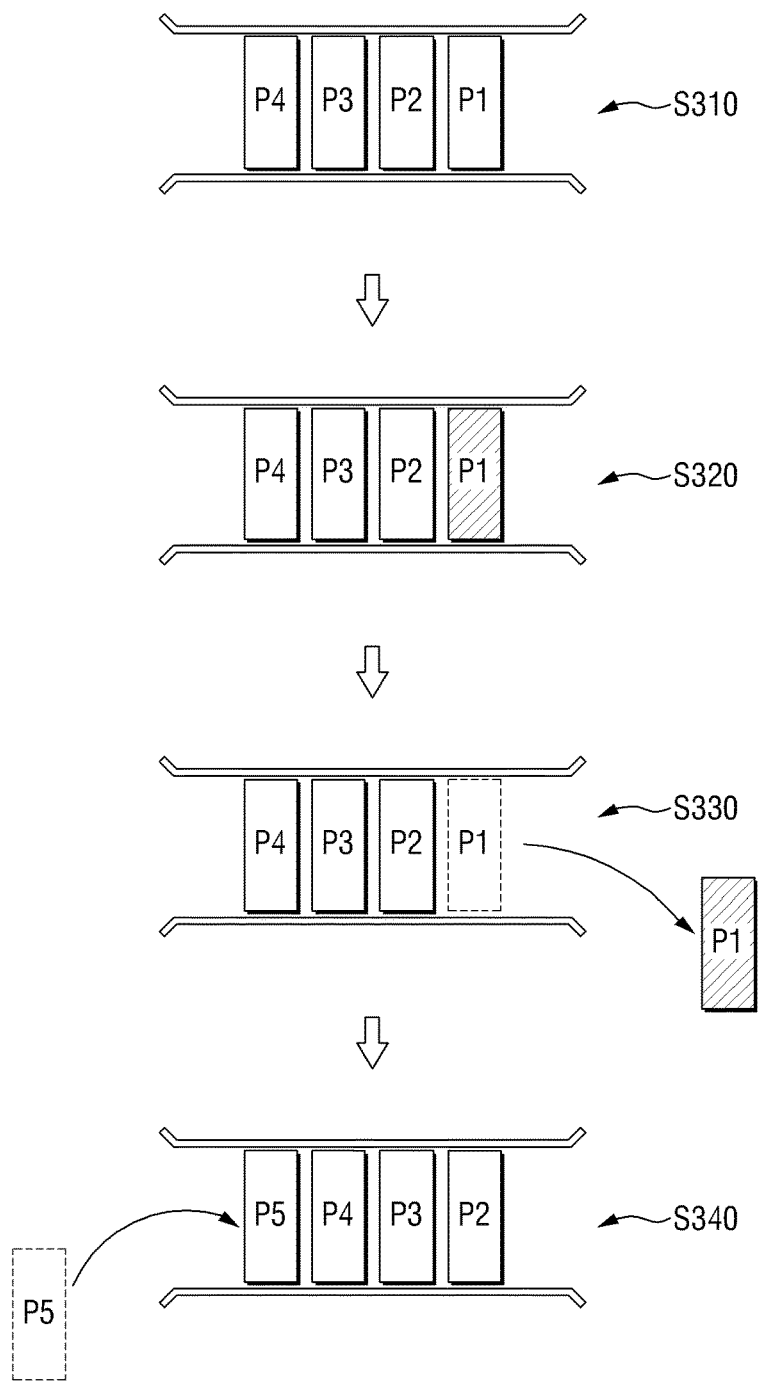
FIGS. 3 and 4 are conceptual diagrams illustrating procedures of processing wireless packets input to a buffer, according to exemplary embodiments.
Figure 4:
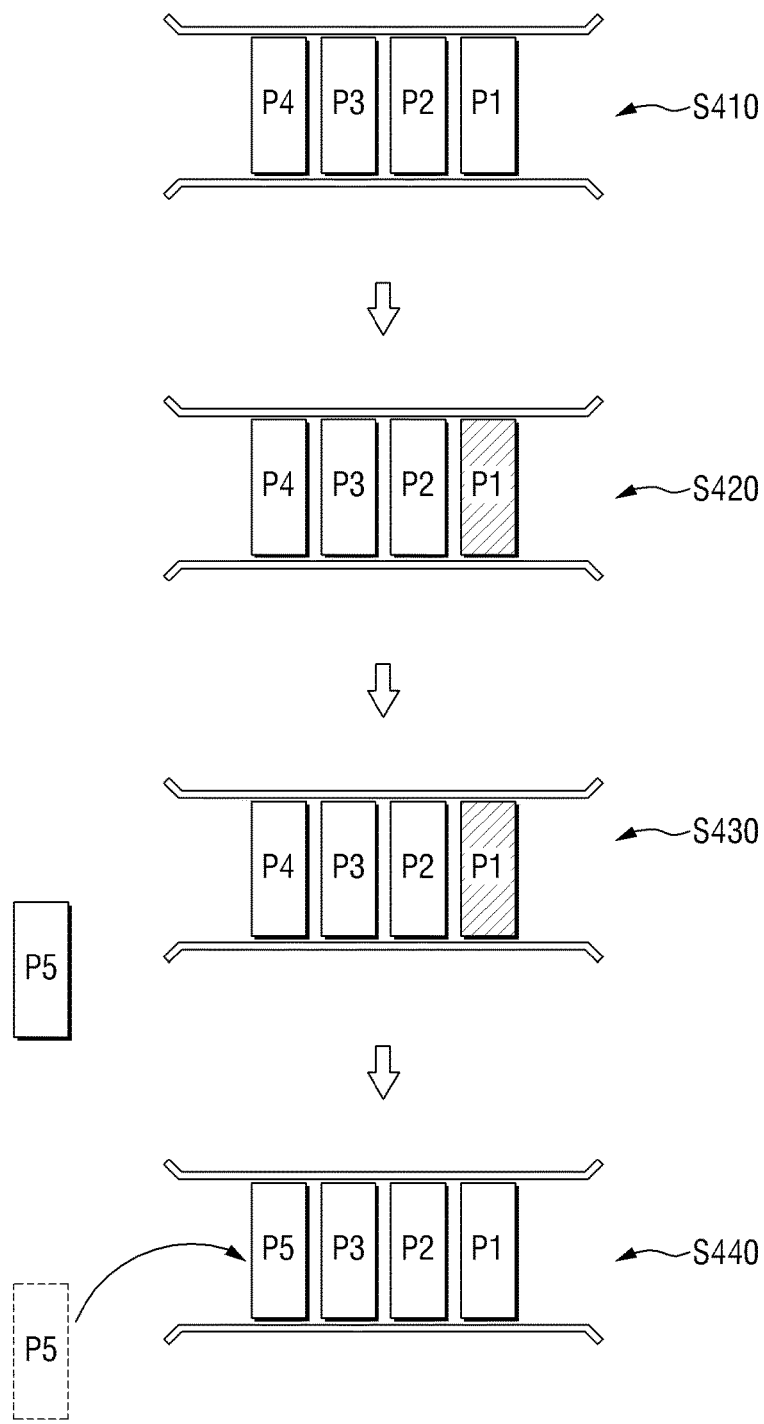

FIGS. 3 and 4 are conceptual diagrams illustrating procedures of processing wireless packets input to a buffer.

The data processors included in the packet transmitting apparatus 110 and the packet receiving apparatus 120 may sequentially process a plurality of wireless packets stored in a buffer included in the data processors.

Referring to FIG. 3, in step S310, the buffer stores wireless packets P1 to P4. The wireless packets P1, P2, P3 and P4 may be sequentially stored in the buffer in that order.

In step S320, the data processor performs data processing on the wireless packet P1 firstly input to the buffer. For example, the data processor may check integrity of the wireless packets and may remove a header to then encode or decode the data.

In step S330, the data processor may remove the processed wireless packet from the buffer. As the wireless packet is removed from the buffer, the buffer may secure a space for recording another wireless packet.

In step S340, the buffer inputs a new wireless packet P5 and stores the same. Since the wireless packet P1 is removed from the buffer, the buffer may have a sufficient space so that the wireless packet P5 can be normally stored in the buffer.

After completing of the data processing of the wireless packet P1, the data processor may perform data processing on the wireless packet P2. Such operations of the data processor may be performed until the wireless packets stored in the buffer are completely removed.

Meanwhile, since the data processor of the packet transmitting apparatus 110 or the packet receiving apparatus 120, which is a low power wireless communication apparatus, operates with a small amount of power, it may not be capable of processing data at a high speed. Therefore, the data processor may perform data processing by detecting an event in an interrupt mode, rather than a polling mode.

In a polling mode, even if there is no data to be processed, event detection is periodically performed, consuming a relatively high amount of power. In an interrupt mode, event detection is performed only when data to be processed is generated, so that a relatively small amount of power may be consumed. Therefore, the data processor of the packet transmitting apparatus 110 or the packet receiving apparatus 120 performs event detection basically in the interrupt mode.

In the interrupt mode, since an unexpected event is detected, the data processor may need to instantaneously perform many computation steps whenever event detection is performed. That is to say, as the interrupt mode is employed, the wireless packets stored in the buffer may not be properly processed, which is illustrated in FIG. 4.

Referring to FIG. 4, in step S410, the buffer stores wireless packets P1 to P4. The wireless packets P1, P2, P3 and P4 may be sequentially stored in the buffer in that order.

In step S420, the data processor performs data processing on the wireless packet P1 firstly input to the buffer. For example, the data processor may check integrity of the wireless packets and may remove a header to then encode or decode the data.

Meanwhile, when event detection is performed in an interrupt mode, data processing capability of the data processor is low. Thus, like in step S430, even if a new wireless packet P5 is ready to be input to the buffer, the data processor may still perform data processing on the wireless packet P1.

Accordingly, even if the processing of the wireless packet P1 is not completed, the new wireless packet P5 is input to the buffer in step S440. Here, if there is no space for accommodating the wireless packets P1 to P5 in the buffer, the new wireless packet P5 may be stored in a space where an existing wireless packet is stored, and the existing wireless packet stored in the buffer may be damaged. FIG. 4 illustrates that the new wireless packet P5 is stored in a space where the existing wireless packet 4 is stored.

Eventually, the wireless packet 4 may not be normally processed, so that the data processed by the data processor may not serve as correct information. For example, the wireless packets stored in the buffer may be wireless packets constituting a motion video stream. As some of the wireless packets are damaged, a screen of the motion video stream may be damaged in part or in whole.

In order to prevent the data from being damaged, the packet transmitting apparatus 110 or the packet receiving apparatus 120 according to an exemplary embodiment may perform event detection by switching to in a polling mode or an interrupt mode according to the transmitting/receiving periods of wireless packets.

Figure 5:
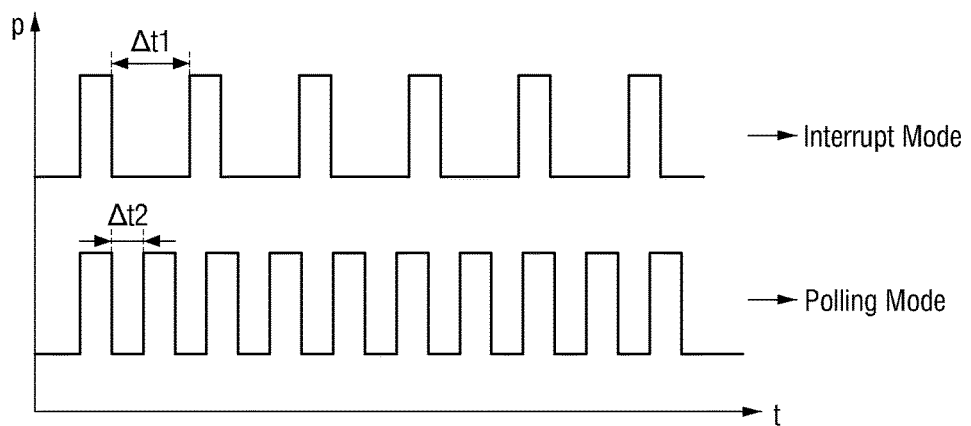
FIG. 5 is a conceptual diagram illustrating an event detection mode selected by a transmitting/receiving period of a wireless packet according to an exemplary embodiment.

FIG. 5 is a conceptual diagram illustrating an event detection mode selected by a transmitting/receiving period of a wireless packet according to an exemplary embodiment.

The packet transmitting apparatus 110 and the packet receiving apparatus 120 may perform event detection by switching to the interrupt mode or the polling mode according to the transmitting/receiving periods of wireless packets. That is to say, as shown in FIG. 5, if a transmitting/receiving period ($\Delta t1$) of a wireless packet is greater than or equal to a predetermined critical value, the event detection method is switched to the interrupt mode, and if a transmitting/receiving period ($\Delta t2$) of the wireless packet is less than the predetermined critical value, the event detection method is switched to the polling mode.

Since events are detected in the interrupt mode, compared to in the polling mode, the data processor may perform data processing with relatively low power. When events are detected in the polling mode, compared to in the interrupt mode, the data processor may perform data processing in relatively high efficiency.

Figure 6:
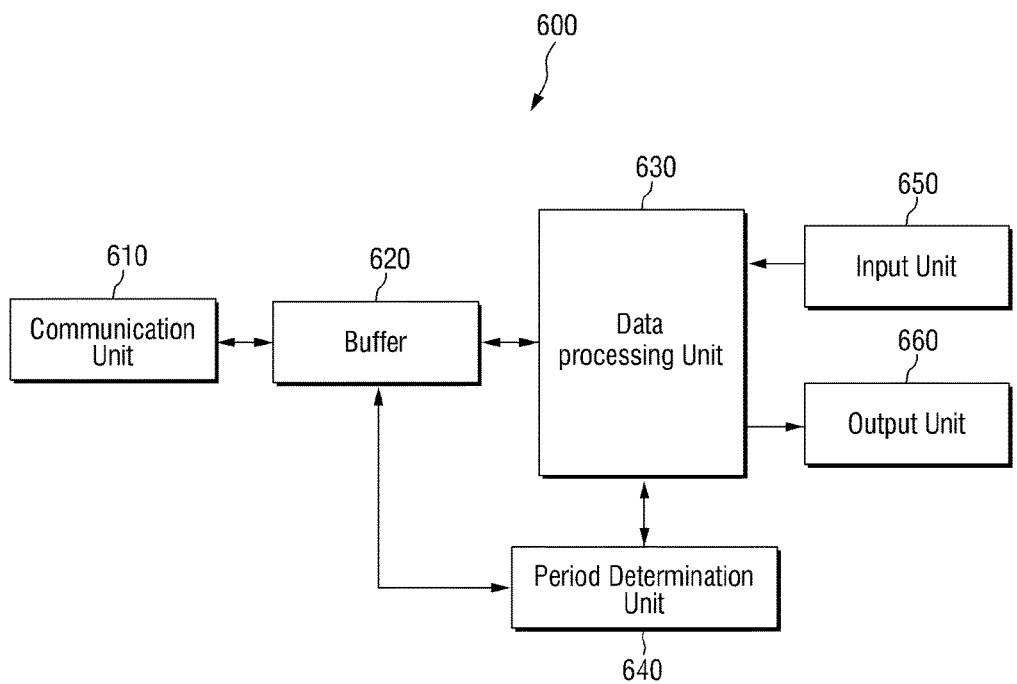
FIG. 6 is a block diagram of a data processing apparatus according to an exemplary embodiment.

FIG. 6 is a block diagram of a data processing apparatus according to an exemplary embodiment.

The data processing apparatus 600 according to an exemplary embodiment, which is incorporated into the packet transmitting apparatus 110 or the packet receiving apparatus 120, may transmit or receive wireless packets and process data included in the wireless packets.

Referring to FIG. 6, the data processing apparatus 600 includes a communication unit 610, a buffer 620, a data processor 630, a period determination unit 640, an input unit 650, and an output unit 660.

The communication unit 610 may transmit or receive wireless packets. When the data processing apparatus 600 is the packet transmitting apparatus 110, the communication unit 610 transmits wireless packets and when the data processing apparatus 600 is the packet receiving apparatus 120, the communication unit 610 may receive wireless packets.

The buffer 620 may store one or more wireless packets. The wireless packets received by the communication unit 610 or the wireless packets to be transmitted by the communication unit 610 may be temporarily stored in the buffer 620.

The period determination unit 640 may determine transmitting/receiving periods of the one or more wireless packets stored in the buffer 620. That is to say, the period determination unit 640 may determine whether the transmitting/receiving periods of the one or more wireless packets is less than or greater than or equal to a predetermined critical value.

The period determination unit 640 may determine the transmitting/receiving periods of the one or more wireless packets by referring to transmitting/receiving period information included in a wireless packet. The wireless packet may include transmitting/receiving period information about time intervals between the wireless packet and wireless packets to be subsequently transmitted or received. The period determination unit 640 may determine the transmitting/receiving periods of the one or more wireless packets by referring to the transmitting/receiving period information included in the wireless packet. The period determination unit 640 may determine an actual transmitting/receiving period or a relationship between the transmitting/receiving period and the critical value by referring to the transmitting/receiving period information included in the wireless packet.

In addition, the period determination unit 640 may determine the transmitting/receiving periods of the one or more wireless packets by measuring time intervals of the wireless packets continuously transmitted or received. For example, the period determination unit 640 may determine the transmitting/receiving periods based on an interval between a transmitting time of one wireless packet and a transmitting time of another wireless packet. The transmitting/receiving periods may be determined by referring to a mean value of multiple time intervals. The mean value is obtained by collecting the multiple time intervals of wireless packets and calculating the mean value of the multiple time intervals.

The data processor 630 detects an event in a polling mode or an interrupt mode according to the transmitting/receiving periods determined by the period determination unit 640, and may process data included in the one or more wireless packets stored in the buffer 620. Here, if the transmitting/receiving periods are less than a critical value, the data processor 630 switches to the polling mode for event detection, and if the transmitting/receiving periods are greater than or equal to the critical value, the data processor 630 switches to the interrupt mode for event detection.

In order to reduce power consumption, event detection may be basically performed in the interrupt mode. That is to say, unless it is determined that the transmitting/receiving periods are less than the critical value, the data processor 630 performs event detection in the interrupt mode.

As described above, in order to reduce power consumption, the data processor 630 may make an attempt to switch to the interrupt mode. For example, in a state in which event detection is performed in the polling mode, if the transmitting/receiving periods greater than or equal to the critical value lasts for a predetermined time, the data processor 630 may switch the event detection method to the interrupt mode.

Meanwhile, in order to improve data processing efficiency, if it is determined that the transmitting/receiving periods are less than the critical value, the data processor 630 may immediately switch the event detection method to the polling mode.

The data processor 630 may process the data included in the wireless packet corresponding to a detected event, among the one or more wireless packets stored in the buffer 620, and may remove the data-processed wireless packet from the buffer 620. As the data-processed wireless packet is removed from the buffer 620, the buffer 620 may secure a space for storing a new packet.

The operation of the data processor 630 according to the exemplary embodiment may be performed by a central processor (CPU), and the CPU may be the data processor 630.

The input unit 650 may receive data for constructing packets as its input. For example, the input unit 650 may receive data of an image photographed by a camera (not shown). The camera (not shown) may incorporate or may be incorporated into the data processing apparatus 600, or may be implemented as a separate device.

The data input through the input unit 650 is constructed as packets by the data processor 630 to then be transmitted by the communication unit 610. When the data processing apparatus 600 is the packet receiving apparatus 120, the input unit 650 receiving data of an image may not be necessarily provided.

The output unit 660 may output the data transmitted from the data processor 630. For example, the output unit 660 may reproduce video data or audio data or may transfer the data to an apparatus capable of reproducing the data. When the data processing apparatus 600 is the packet transmitting apparatus 110, the output unit 660 reproducing video data or audio data may not be necessarily provided.

Figure 7:
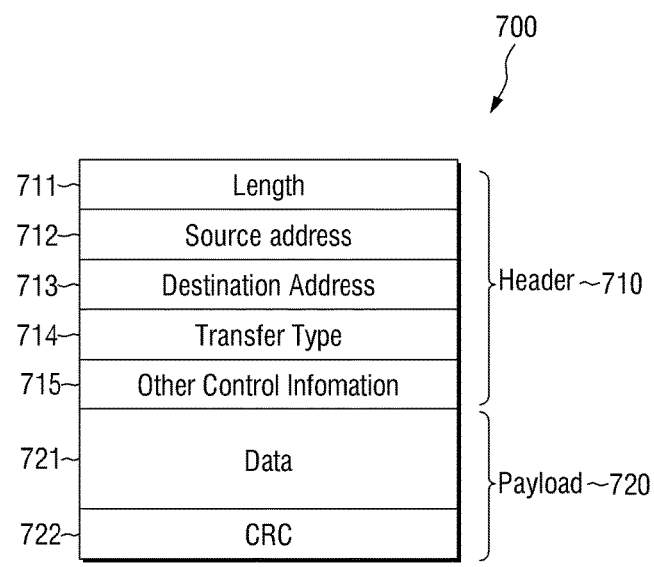
FIG. 7 is a diagram of a wireless packet according to an exemplary embodiment.

FIG. 7 is a diagram of a wireless packet according to an exemplary embodiment.

Referring to FIG. 7, a wireless packet 700 includes a header 710 and a payload 720. The header 710 includes a length field 711, a source field 712, a destination field 713, a transfer type field 714, and other control information field 715, and the payload 720 includes a data field 721 and an integrity check or cyclic redundancy check (CRC) field 722.

The length field 711 includes information about an overall length of the wireless packet 700, the source field 712 includes information about a network address of an apparatus for transmitting the wireless packet 700, and the destination field 713 includes information about a network address of an apparatus for receiving the wireless packet 700.

The transfer type field 714 includes transmitting/receiving period information as a transfer type of the wireless packet 700. According to an exemplary embodiment, the transmitting/receiving period information may be an actual transmitting/receiving period of the wireless packet 700 or a relationship between the transmitting/receiving period and a critical value. For example, when the transmitting/receiving periods are less than the critical value, the transmitting/receiving period information includes a flag representing a fast transfer type. When the transmitting/receiving periods are greater than or equal to the critical value, the transmitting/receiving period information includes a flag representing a slow transfer type.

The period determination unit 640 of the data processing apparatus 600 may determine the transmitting/receiving periods by referring to the transmitting/receiving period information included in the transfer type field 714. That is to say, the period determination unit 640 may determine the actual transmitting/receiving period or the relationship between the transmitting/receiving period and the critical value.

The other control information field 715 includes separate additional information about the wireless packet 700 or additional information intended to be transmitted by the packet transmitting apparatus 110. When transmission of additional information is not necessary, no information may be included in the other control information field 715.

The data field 721 includes data intended to be transmitted to the packet receiving apparatus 120 by the packet transmitting apparatus 110. For example, the data field 721 may include video data of an image photographed by a camera. The data processor 630 of the data processing apparatus 600 may perform data processing by extracting the data included in the data field 721.

The integrity check field 722 includes integrity check information. CRC values may be included in the integrity check field 722 as the integrity check information. The packet receiving apparatus 120 may check whether the wireless packet 700 has an error or not, by referring to the integrity check information. Meanwhile, the integrity check field 722 may also include parity bits, check digits, Hamming codes or frame check sequences as the integrity check information.

Figure 8:
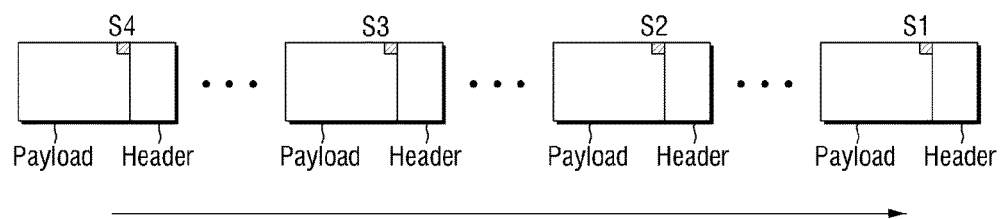
FIG. 8 is a flow diagram of consecutive wireless packets according to an exemplary embodiment.

FIG. 8 is a flow diagram of consecutive wireless packets according to an exemplary embodiment.

When data to be transmitted by the packet transmitting apparatus 110 is too big to be included in one wireless packet, the data is separated into multiple pieces and then transmitted in a state in which the multiple pieces of data are included in a plurality of wireless packets, respectively.

Here, the respective wireless packets may have data sequence numbers, which may be included in the payload 720.

FIG. 8 illustrates that sequence numbers S1 to S4 are included in payloads 720 of the wireless packets.

When the sequence numbers S1 to S4 are referred to as being included in the payloads 720 of the wireless packets, the wireless packets are transmitted and received at relatively short time intervals, and the period determination unit 640 of the packet receiving apparatus 120 may use the sequence numbers S1 to S4 as the transmitting/receiving period information. That is to say, when the sequence numbers S1 to S4 are not included in the payloads 720 of the wireless packets, the period determination unit 640 determines that the transmitting/receiving periods are greater than or equal to the critical value, and when the sequence numbers S1 to S4 are included in the payloads 720 of the wireless packets, the period determination unit 640 determines that the transmitting/receiving periods are less than the critical value.

Eventually, the period determination unit 640 determines the transmitting/receiving periods from the transmitting/receiving period information included in the headers 710 of wireless packets or the sequence numbers S1 to S4 included in the headers 710.

While it has been described that the period determination unit 640 of the packet receiving apparatus 120 determines the transmitting/receiving periods by referring to the sequence numbers S1 to S4 included in the payloads 720, the period determination unit 640 of the packet transmitting apparatus 110 may also determine the transmitting/receiving periods by referring to the sequence numbers S1 to S4 included in the payloads 720. For example, when data to be transmitted is input through the input unit 650, the sequence numbers S1 to S4 may be input together with the data, or the data including the sequence numbers S1 to S4 may be input.

Figure 9:
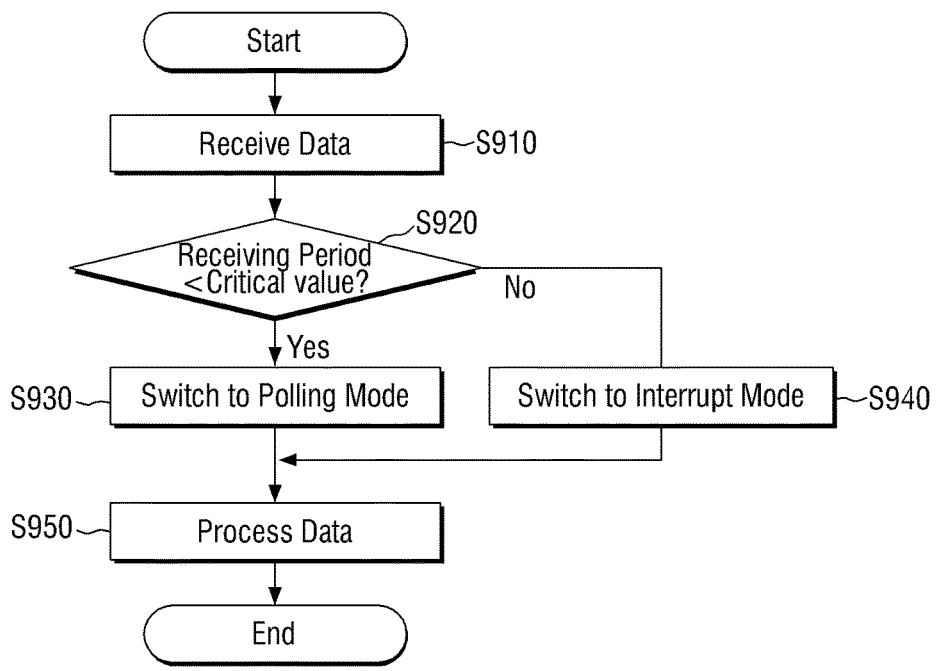
FIGS. 9 and 10 are flow diagrams of data processing methods according to exemplary embodiments.
Figure 10:
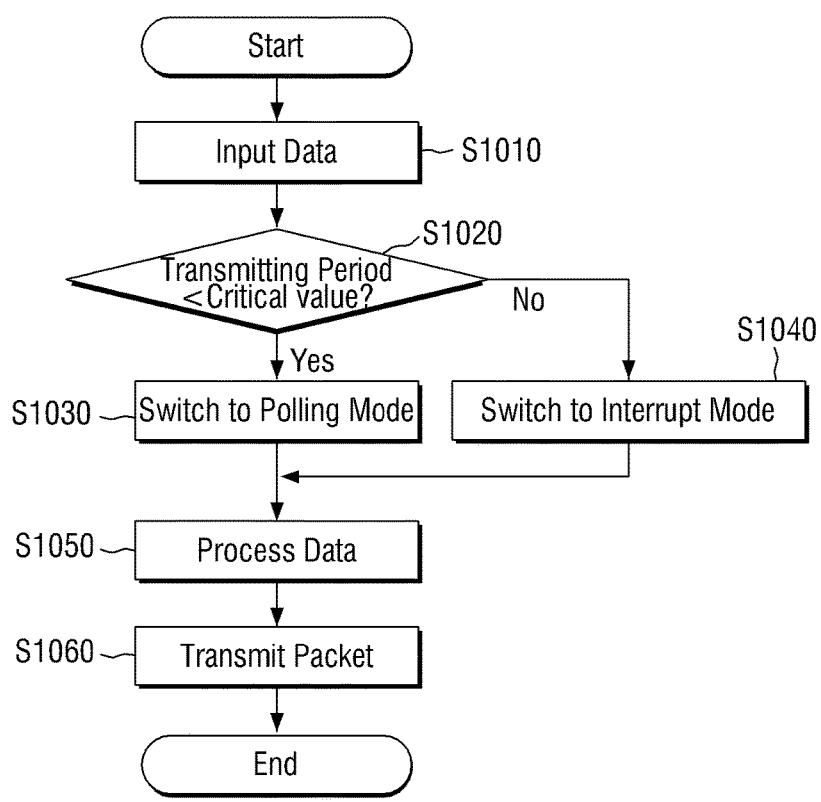

FIGS. 9 and 10 are flow diagrams of data processing methods according to exemplary embodiments. Specifically, FIG. 9 is a flow diagram illustrating a data processing procedure by a packet receiving apparatus 120 and FIG. 10 is a flow diagram illustrating a data processing procedure by a packet transmitting apparatus 110.

Referring to FIG. 9, the communication unit 610 receives a wireless packet (S910). As the wireless packet is received, the period determination unit 640 determines a transmitting/receiving period of the wireless packet (S920). In order to determine the receiving period, the period determination unit 640 may refer to transmitting/receiving period information included in the header 710 of the wireless packet or the sequence number included in the payload 720.

Alternatively, the period determination unit 640 may determine the receiving period by referring to time intervals of continuously received wireless packets.

When it is determined by the period determination unit 640 that the receiving period is less than a critical value, the data processor 630 switches an event detection method to a polling mode (S930), and when it is determined by the period determination unit 640 that the receiving period is greater than or equal to the critical value, the data processor 630 switches the event detection method to an interrupt mode (S940).

The data processor 630 performs data processing according to the switched event detection method while performing event detection (S950).

Referring to FIG. 10, the input unit 650 receives data for constructing packets (S1010). As the data is received as input, the period determination unit 640 determines a transmitting/receiving period of the wireless packet (S1020). In order to determine the transmitting period, the period determination unit 640 may refer to the time intervals of inputting data, or sequence numbers.

When it is determined by the period determination unit 640 that the transmitting period is less than a critical value, the data processor 630 switches an event detection method to a polling mode (S1030), and when it is determined by the period determination unit 640 that the transmitting period is greater than or equal to the critical value, the data processor 630 switches the event detection method to an interrupt mode (S1040).

The data processor 630 performs data processing according to the switched event detection method while performing event detection (S1050), and generates the wireless packet. The generated wireless packet is transmitted through the communication unit 610 (S1060).

As described above, since the event detection method is switched to the polling mode or the interrupt mode according to the transmitting/receiving period of wireless packets, data processing efficiency can be improved while reducing power consumption.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units represented by a block as illustrated in FIGS. 1, 2 and 6 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

While the present invention has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the present embodiments be considered in all respects as illustrative and not restrictive, reference being made to the appended claims rather than the foregoing description to indicate the scope of the invention.

What is claimed is:

1. An apparatus for processing data, the apparatus comprising:
a buffer configured to store wireless packets; and
at least one processor configured to:
select an event detection mode between a polling mode and an interrupt mode, based on a determination of whether a periodic time interval, at which the wireless packets are transmitted or received, is greater than or equal to a threshold value; and
process data included in the wireless packets by detecting an event in one of the polling mode and the interrupt mode according to the selected event detection mode,
wherein the selecting the event detection mode comprises:
based on the periodic time interval being greater than or equal to the threshold value, select the interrupt mode as the selected event detection mode,
based on the periodic time interval being less than the threshold value, select the polling mode as the selected event detection mode.

2. The apparatus of claim 1, wherein the determination of whether the periodic time interval is greater than or equal to the threshold value is determined by referring to period information included in at least one of the wireless packets.

3. The apparatus of claim 1, wherein the determination of whether the periodic time interval is greater than or equal to the threshold value is determined by measuring time intervals of the wireless packets continuously transmitted or received.

4. The apparatus of claim 1, wherein the determination of whether the periodic time interval is greater than or equal to the threshold value is determined based on whether sequence numbers are included in payloads of the wireless packets.

5. The apparatus of claim 1, wherein the event is detected in the polling mode in response to the periodic time interval being less than the threshold value, and the event is detected in the interrupt mode in response to the periodic time interval being greater than or equal to the threshold value.

6. The apparatus of claim 5, wherein the at least one processor switches the event detection mode from the polling mode to the interrupt mode in response to the periodic time interval being greater than or equal to the threshold value for at least a predetermined time duration.

7. The apparatus of claim 1, wherein the at least one processor is further configured to process the data included in a wireless packet corresponding to the detected event, among the wireless packets, and remove the data-processed wireless packet from the buffer.

8. The apparatus of claim 1, wherein the apparatus is incorporated into a low-power wireless communication apparatus.

9. The apparatus of claim 8, wherein the low-power wireless communication apparatus is driven by battery power.

10. The apparatus of claim 8, wherein the low-power wireless communication apparatus comprises at least one of a built-in camera and an apparatus for transmitting an image transferred from the built-in camera.

11. A method for processing data, the method comprising:
storing wireless packets in a buffer;
selecting an event detection mode between a polling mode and an interrupt mode, based on a determination of whether a periodic time interval, at which wireless packets are transmitted or received, is greater than or equal to a threshold value; and
processing data included in the wireless packets by detecting an event in one of the polling mode and the interrupt mode according to the selected event detection mode,
wherein the selecting the event detection mode comprises:
based on the periodic time interval being greater than or equal to the threshold value, selecting the interrupt mode as the selected event detection mode,
based on the periodic time interval being less than the threshold value, selecting the polling mode as the selected event detection mode.

12. The method of claim 11, wherein the determination of whether the periodic time interval is greater than or equal to the threshold value is determined by referring to period information included in at least one of the wireless packets.

13. The method of claim 11, wherein the determination of whether the periodic time interval is greater than or equal to the threshold value is determined by measuring time intervals of the wireless packets continuously transmitted or received.

14. The method of claim 11, wherein the determination of whether the periodic time interval is greater than or equal to the threshold value is determined based on whether sequence numbers are included in payloads of the wireless packets.

15. The method of claim 11, wherein the event is detected in the polling mode in response to the periodic time interval being less than the threshold value, and the event is detected in an interrupt mode in response to the periodic time interval being greater than or equal to the threshold value.

16. The method of claim 15, further comprising switching the event detection mode from the polling mode to the interrupt mode in response to the periodic time interval being greater than or equal to the threshold value for at least a predetermined time duration.

17. The method of claim 11, wherein the processing the data comprises processing the data included in a wireless packet corresponding to the detected event, among the wireless packets, and removing the data-processed wireless packet from the buffer.

18. The method of claim 11, wherein the processing the data is performed by a low-power wireless communication apparatus.

19. The method of claim 18, wherein the low-power wireless communication apparatus is driven by battery power.

20. The method of claim 18, wherein the low-power wireless communication apparatus comprises at least one of a built-in camera and an apparatus for transmitting an image transferred from the built-in camera.

* * * * *